(12) United States Patent
Clark et al.

(10) Patent No.: US 8,208,169 B2
(45) Date of Patent: Jun. 26, 2012

(54) METHOD AND SYSTEM FOR RENDERING A TRANSPARENT OBJECT IN AN IMAGE

(75) Inventors: Raymond Edward Clark, Georgetown, KY (US); Robert Lawrence Cook, Lexington, KY (US); Ning Ren, Lexington, KY (US); Martin Geoffrey Rivers, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1144 days.

(21) Appl. No.: 11/420,115

(22) Filed: May 24, 2006

(65) Prior Publication Data

US 2008/0024810 A1     Jan. 31, 2008

(51) Int. Cl.
    G06F 3/12     (2006.01)
(52) U.S. Cl. ....................................... 358/1.9
(58) Field of Classification Search ................ 358/1.9
    See application file for complete search history.

(56) References Cited

U.S. PATENT DOCUMENTS

| | | | |
|---|---|---|---|
| 5,638,498 A | | 6/1997 | Tyler et al. |
| 5,642,474 A | * | 6/1997 | Parkhurst et al. ............ 358/1.18 |
| 5,805,174 A | | 9/1998 | Ramchandran |
| 5,926,185 A | | 7/1999 | Vyncke et al. |
| 6,384,936 B1 | * | 5/2002 | Letellier ........................ 358/1.9 |
| 6,466,229 B1 | | 10/2002 | Nagao |
| 6,535,293 B1 | | 3/2003 | Mitsuhashi |
| 6,616,359 B1 | | 9/2003 | Nakagiri et al. |
| 6,970,958 B2 | | 11/2005 | Tohki |
| 7,532,355 B2 | | 5/2009 | Gauthier et al. |
| 2001/0050781 A1 | | 12/2001 | Kujirai |
| 2004/0052416 A1 | * | 3/2004 | Curry et al. ................... 382/173 |
| 2004/0085558 A1 | | 5/2004 | Minns et al. |
| 2005/0213114 A1 | | 9/2005 | Clark et al. |
| 2005/0213117 A1 | | 9/2005 | Clark et al. |
| 2005/0213119 A1 | | 9/2005 | Clark et al. |
| 2005/0213130 A1 | | 9/2005 | Bender et al. |
| 2005/0213142 A1 | | 9/2005 | Clark et al. |
| 2005/0213145 A1 | | 9/2005 | Clark et al. |
| 2008/0137119 A1 | | 6/2008 | Clark et al. |
| 2009/0097067 A1 | | 4/2009 | Cook et al. |
| 2009/0109459 A1 | | 4/2009 | Bender et al. |

OTHER PUBLICATIONS

Non-Final Office Action for U.S. Appl. No. 10/983,390, U.S. Patent and Trademark Office, dated Mar. 4, 2009.
Notice of Allowance for U.S. Appl. No. 10/810,140, U.S. Patent and Trademark office, dated Mar. 21, 2008.
Non-Final Office Action for U.S. Appl. No. 10/983,952, U.S. Patent and Trademark Office, dated Feb. 5, 2009.
Notice of Allowance for U.S. Appl. No. 10/810,004, U.S. Patent and Trademark Office, dated Dec. 8, 2009.
Non-Final Office Action for U.S. Appl. No. 10/810,143, U.S. Patent and Trademark Office, dated Nov. 30, 2009.
Final Office Action for U.S. Appl. No. 10/983,826, U.S. Patent and Trademark Office, dated Jan. 14, 2010.

* cited by examiner

*Primary Examiner* — Benny Q Tieu
*Assistant Examiner* — Qian Yang

(57) ABSTRACT

A system, method and article are associated with receiving raster operation objects. If a first exclusive OR raster operation object, a copy raster operation object and a second exclusive OR raster operation object are received, shape data associated with either the first or second exclusive OR raster operation object is selected. Additionally, color data associated with either the first or second exclusive OR raster operation object is selected and mask data associated with the copy raster operation object is selected to render a transparent image.

34 Claims, 5 Drawing Sheets

METHOD AND SYSTEM FOR RENDERING A TRANSPARENT OBJECT IN AN IMAGE

TECHNICAL FIELD

This disclosure relates to graphics processing and, more particularly, to rendering transparent images with a printing device.

BACKGROUND

Printing devices often render images from data received from computer systems or other types of digital devices. The received data may be provided in a specialized language. For example, the data may comply with a page description language (PDL) that specifies the arrangement of a printed page through commands from the computer system that the printing device carries out. A PDL may describe page elements such as geometrical objects (e.g., lines, arcs, etc.). Furthermore, a PDL may define page elements independent of printer type so that pages are consistently rendered across different types of printers. The printer itself typically processes PDL commands and data to produce the images to be rendered. For example, the printer may process PDL commands for rendering a transparent image.

Unfortunately, a considerable amount of printer processing time and memory may be needed which may tax the printer.

SUMMARY OF THE DISCLOSURE

In one exemplary embodiment, the present invention relates to a method that includes receiving a first exclusive OR raster operation object, a copy raster operation object and a second exclusive OR raster operation object. The first exclusive OR raster operation object matches the second exclusive OR raster operation object. The method also includes selecting shape data associated with either the first or second exclusive OR raster operation object. The method also includes selecting color data associated with either the first or second exclusive OR raster operation object. The method also includes selecting mask data associated with the copy raster operation object. The selected data is used to render a transparent image.

In another exemplary embodiment, the present invention relates to an article that includes a storage medium that stores instructions that when executed by a machine result in the following operations: receiving a first exclusive OR raster operation object, receiving a copy raster operation object, and receiving a second exclusive OR raster operation object. The first exclusive OR raster operation object matches the second exclusive OR raster operation object. The storage medium also stores instructions that when executed by the machine result in the following operations: selecting shape data associated with either the first or second exclusive OR raster operation object, selecting color data associated with either the first or second exclusive OR raster operation object and selecting mask data associated with the copy raster operation object to render a transparent image.

In another exemplary embodiment, the present invention relates to a system including an image processor that receives raster operation objects. If a first exclusive OR raster operation object, a copy raster operation object and a second exclusive OR raster operation object are received, the image processor selects shape data associated with either the first or second exclusive OR raster operation object, selects color data associated with either the first or second exclusive OR raster operation object and selects mask data associated with the copy raster operation object.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
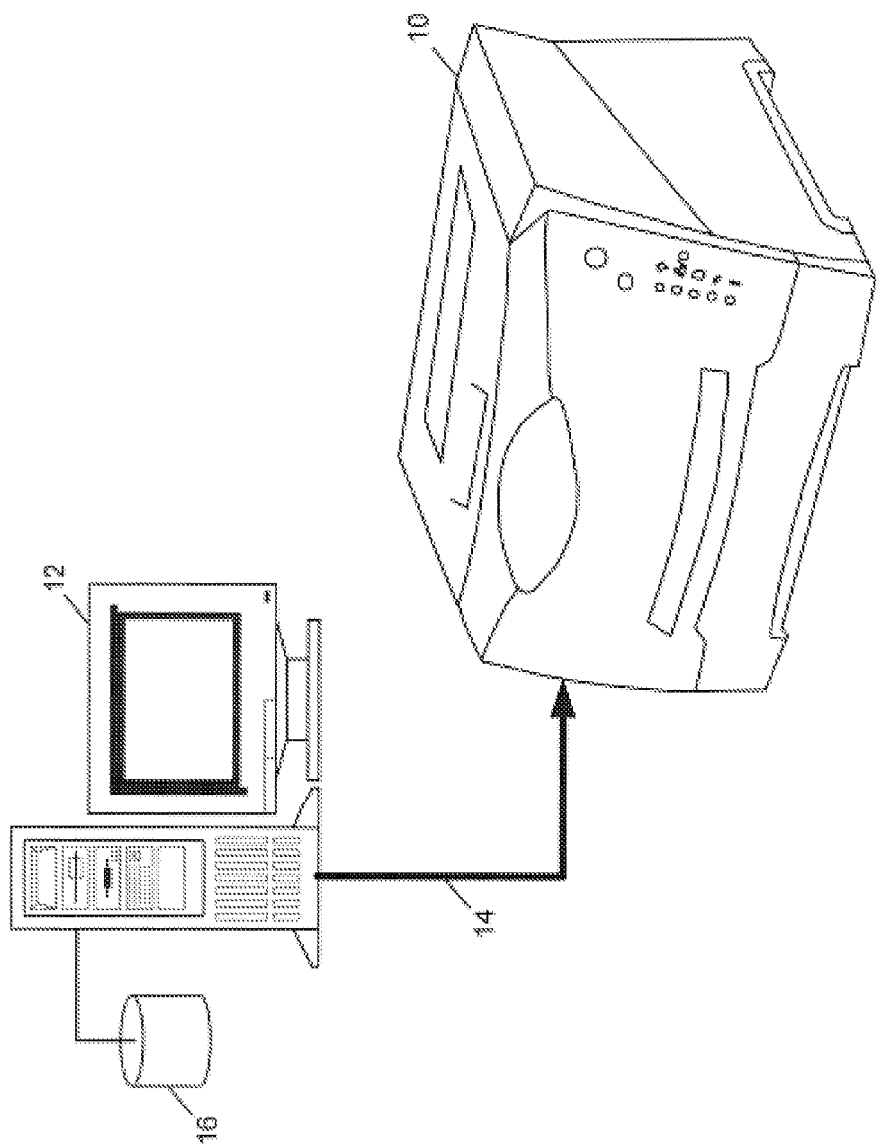
FIG. 1 is a diagrammatic view of a printing device capable of receiving commands and data from a computer system.

Referring to FIG. 1, there is shown an exemplary printing device 10 and a computer system 12 capable of sending commands and data to the printing device for rendering images. Printing device 10 may be coupled to computer system 12 by a cable 14 (e.g., a parallel printer cable, a universal serial bus cable, a network cable, etc.). Alternatively, printing device 10 and computer system 12 may communicate using a wireless technique (e.g., infrared (IR) link, radio frequency (RF) link, etc.). Printing device 10 is one type of image forming device for affixing images on a media. Image forming devices herein may include, e.g., electrophotographic printers, ink-jet printers, dye sublimation printers, thermal wax printers, electrophotographic copiers, electrophotographic multi-function devices, electrophotographic facsimile machines, or other types of image forming devices.

Exemplary printing device 10 may accept textual and/or graphical information from a computing device and may transfer the information to various forms of media (e.g., paper, cardstock, transparency sheets, etc.). In this embodiment, the textual and/or graphical information along with other data (e.g., files, executable instructions, etc.) may be stored on a storage device 16 (e.g., hard drive, CD-ROM, etc.). Additionally, printing device 10 may accept input directly from a removable storage device (e.g., a thumb drive, a memory card, etc.). Further, printing device 10 may receive a printer cartridge that may use various types of image-forming substances (e.g., toner, ink, dye, wax, etc.) for transferring textual and graphical information.

Figure 2:
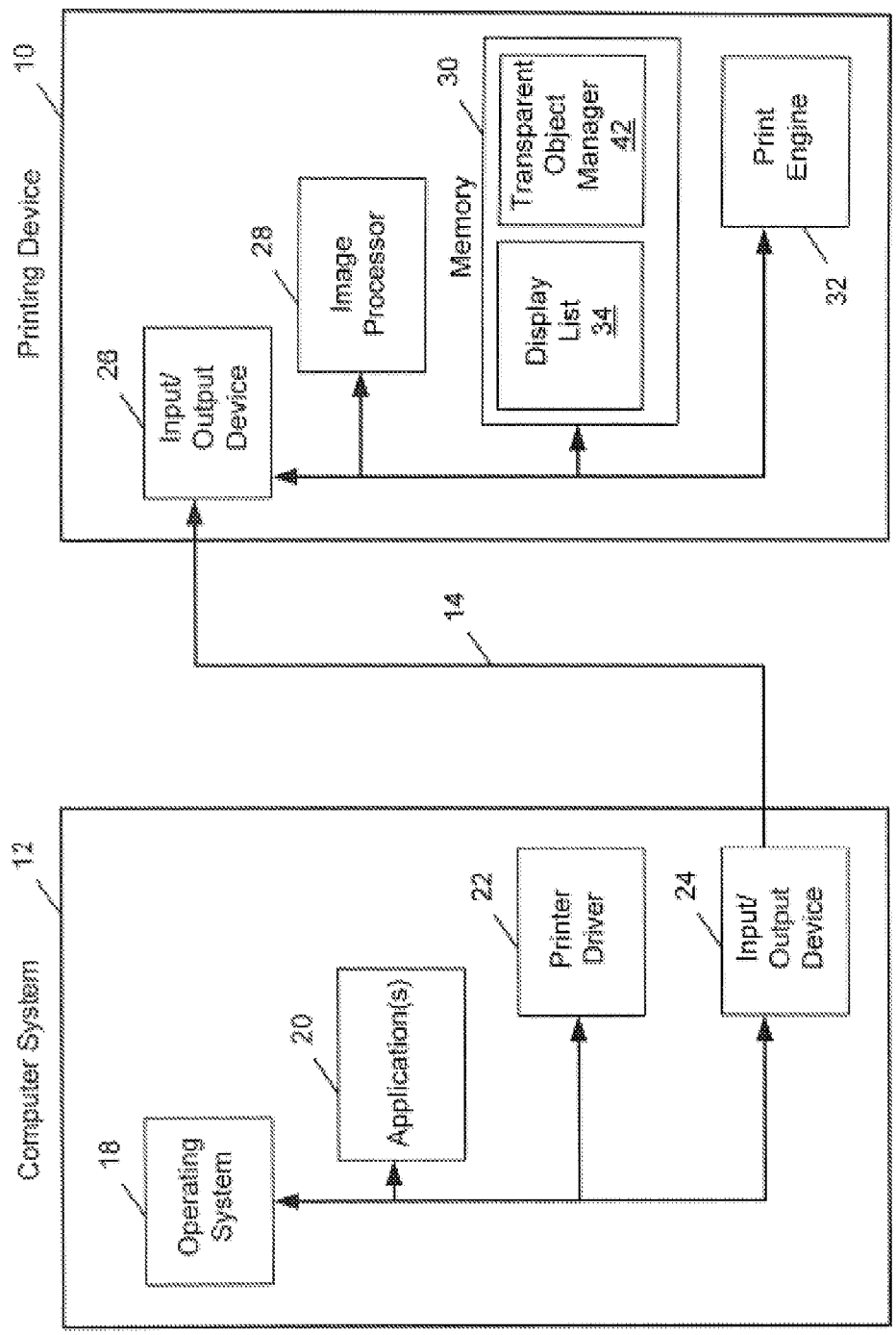
FIG. 2 is a diagrammatic view of portions of the printing device and the computer system of FIG. 1.

Referring to FIG. 2, computer system 12 may include various hardware and software components for executing instructions for sending commands and data to printing device 10. For example, computer system 12 may include an operating system 18, one or more executable applications 20, a printer driver 22 and an input/output (I/O) device 24 (e.g., an I/O circuit card, etc.). To receive commands and data from computer system 12, printing device 10 may include an I/O device 26. Additionally, printing device 10 may include an image processor 28, a memory 30 and a print engine 32. Other embodiments of computer system 12 and/or printing device 10 may include additional or fewer hardware and/or software components.

By executing one or more applications (e.g., a word processor, a spreadsheet, a graphics editing package, etc.) various types of graphics and/or text may be produced and presented on a display screen. In some instances a user may want to print a hardcopy of the graphics and/or text. Based on operations executed by operating system 18, applications 20 and/or printer driver 22, commands and data (collectively referred to as objects) may be produced for transferring the graphics and text to printing device 10 via I/O device 24. Printer driver 22 is generally used to interface a particular printer (e.g., printing device 10) with one or more data formats expected to be encountered. Printer driver 22 may also perform various conversion operations before printing objects are sent to printing device 10. For example, PDL objects may be sent over cable 14 to printing device 10. These PDL objects may describe shapes to be rendered using coordinates and primitives such as rectangles, vectors, circles, and/or polygons. Text may be described by designating characters and fonts rather than describing the appearance of the characters. PDL objects may also represent operations to be performed on the shapes, such as indicating that a particular shape may be partially (or completely) transparent. For example, some PDL objects may include one or more raster operations (ROP). In general a ROP is a logical operation performed on image data. For example, a sequence of objects (e.g., PDL objects) with ROPs may be sent to printing device 10 so that one rendered graphical shape may be positioned upon another shape and may appear transparent.

Printing device 10 may receive PDL objects from computer system 12 via I/O device 26. The PDL objects may be provided to image processor 28 for processing in preparation of rendering one or more images on a media (e.g., paper, transparency, etc.). As the PDL objects are received, the objects are parsed and may be stored in a display list 34 that is stored in memory 30. By storing objects in display list 34, data associated with the objects may be used in combination when executing operations. For example, a sequence of PDL objects may be detected and used to produce an object that appears transparent. As objects are used to execute associated commands, display list 34 may grow until a page is completely described. At this point the page may be considered closed and prepared to be printed. For example, the objects in display list 34 may be rasterized and passed to print engine 32 for actual printing.

In this embodiment, display list 34 is stored in memory 30 that may include non-volatile memory, volatile memory, or other type of memory capable of electronically storing information. For example, memory 30 may include random access memory (RAM), read-only memory (ROM), static memory (e.g., SRAM), dynamic memory (e.g., DRAM) or other type of memory (e.g., non-volatile RAM (NVRAM)) or combinations of memory types. In some embodiments memory 30 may also include a storage device that may implement one or more data storing techniques. For example, memory 30 may include a hard drive, CD-ROM, or other type of type of data storage device.

Image processor 28 may use various processing techniques. For example, image processor 28 may be implemented as one or more general programmable processors (e.g., a microprocessor, etc.) and/or one or more specialized programmable processors (e.g., an application specific integrated circuit (ASIC), field programmable gate array (FPGA), etc.).

Figure 3:
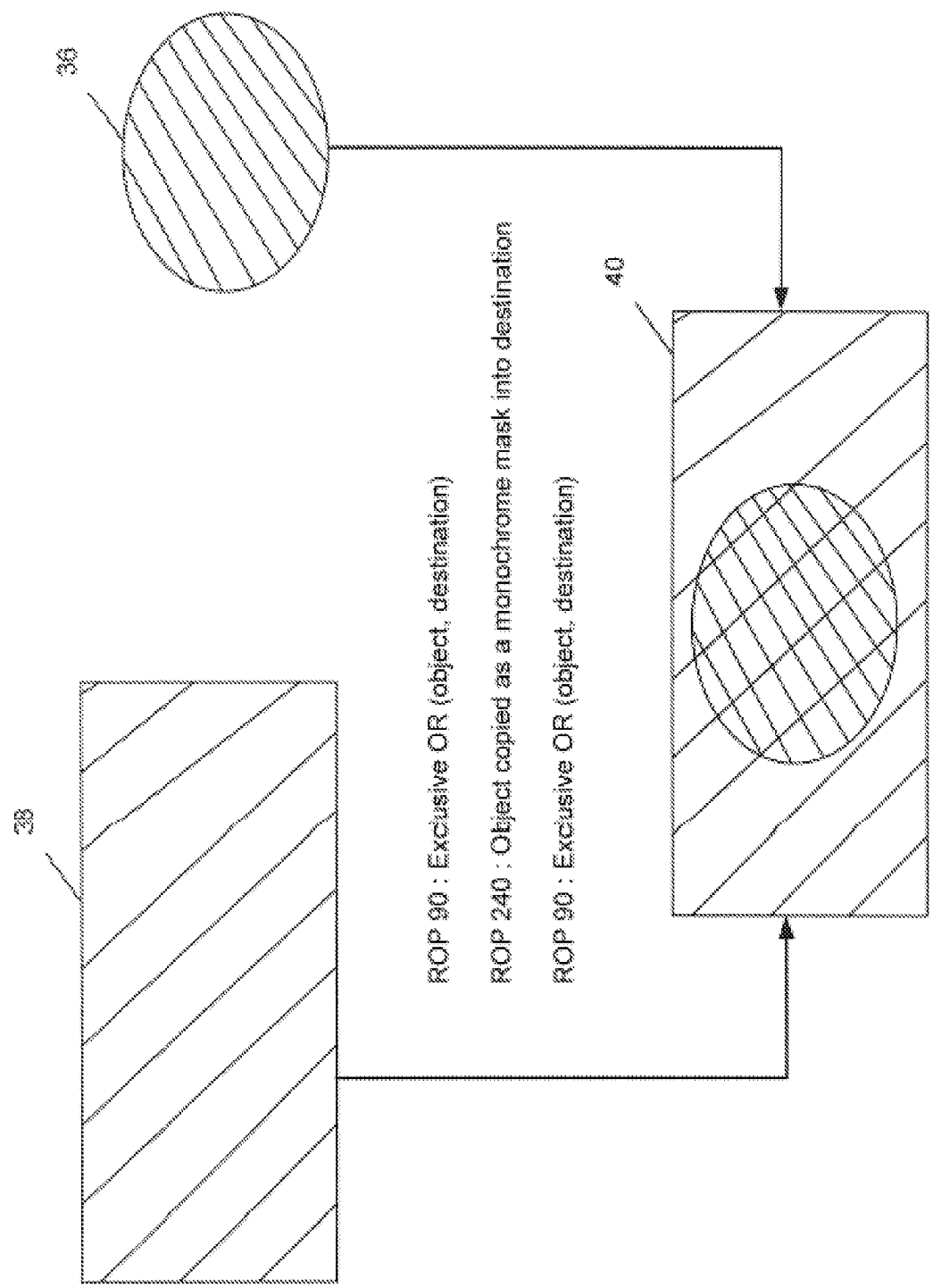
FIG. 3 is an illustration of a transparent object being positioned over another object that may be rendering by the printing device of FIG. 1.

Referring to FIG. 3, as mentioned above, a series of ROPs may be sent to printing device 10 so that one graphical shape appears transparent with respect to shapes positioned beneath. For example, a circular shape 36 may be positioned upon a rectangular shape 38. As illustrated, circular shape 36 may be filled with one style of cross-hatching while rectangular shape 38 may be filled with an opposite style cross-hatching. As evidenced by the two opposing styles of cross-hatching in object 40, circular shape 36 appears transparent when positioned in front of rectangular shape 38.

Figure 5:
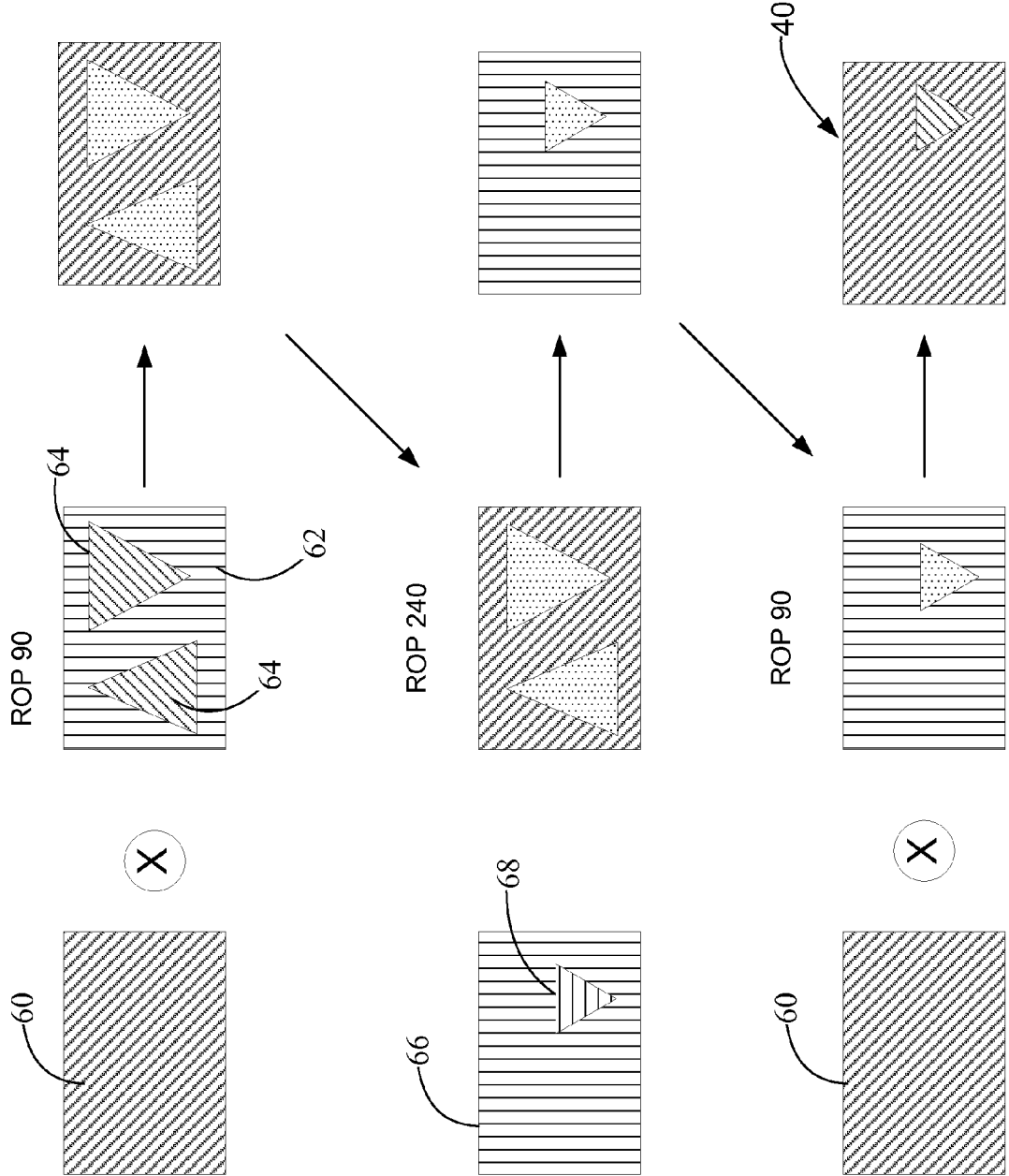
FIG. 5 is an imaging diagram depicting the creation of a transparent image portion from a sequence of three raster operation objects as conventionally known in the art.

Conventionally, to produce a transparent object (e.g., object 40) a series of three objects that each include a ROP may be sent to printing device 10. For example, the first object may include a ROP for requesting that a logical exclusive OR operation be performed. The exclusive OR operation, known as ROP 90, may be performed between an image 60 and a destination 62, as shown in FIG. 5. The image 60 may be represented by particular attributes (e.g., color, shape, etc.) and the destination may represent any images 64 (or none) present on a desired page location. The second object may include a ROP for requesting a copy operation. This ROP, referred to as ROP 240, provides a shape 66 that may be assigned a particular color (e.g., black, represented in FIG. 5 as vertical lines) and may have an associated mask 68. In general a mask 68 may be used to render (or not render) a specific set of image pixels into a destination area of desired page location, and with respect to FIG. 5 is used to not render pixels from shape 66 to the desired page location. A third object used to produce a transparent object is another exclusive OR operation (another ROP 90). To produce the transparent object, the attributes of this second ROP 90 may need to match the attributes of the previous ROP 90. For example, attributes such as shape, color, destination, etc. that are associated with both instances of ROP 90 may need to match. As can be seen in FIG. 5, the second ROP 90 object, when operating on same destination 62 as the first ROP object, results in a portion of the resulting image 40 to include a portion, the triangle, from the image 64 of original destination 62, thereby resulting in the area of image 60 over such triangular portion being transparent.

So, a sequence of three objects with ROPs may be sent from computer system 12 to printing device 10 to produce a transparent image. Each ROP may be associated with an object that may be a relatively large image. In such a situation, a significant portion of memory 30 (shown in FIG. 2) may be needed to store the three objects in display list 34. Additionally a significant portion of memory used for rendering images may be needed. Furthermore, executing operations associated with the three ROPs may considerably tax the processing capabilities of image processor 28 (also shown in FIG. 2).

By reducing the number of objects needed to produce a transparent image, the amount of memory needed by display list may be reduced. Due to this memory conservation, additional objects, data or other information may be stored in memory 30. Additionally, reducing the number of ROPs to be executed correspondingly reduces the processing workload of image processor 28. The conserved processing time may be used to execute other processes or functions.

Referring back to FIG. 2, to reduce the number of objects to be processed and reduce the number of ROPs to be executed, printing device 10 may include a transparent object manager 42. In this embodiment, transparent object manager 42 may reside in memory 30, however, in some embodiments the transparent object manager may be stored in a storage device (e.g., a hard drive, CD-ROM, etc.).

In general, transparent object manager 32 detects the reception of a three ROP sequence (e.g., ROP 90, ROP 240, ROP 90) associated with producing a transparent image. Once detected, transparent object manager 42 may transform the three objects into a single new object having a subset of attributes of one of the ROP 90 objects and a subset of attributes of the ROP 240 object. By using this newly constructed single object, processing workload and memory needs may be reduced. Additionally, transparent object manager 42 may use data associated with the ROP 240 and one ROP 90 to render one image. By reducing the number of images to be rendered, processing workload and memory needs may be further reduced. Thus, a transparent image may be rendered while needing less resources of printing device 10.

In this embodiment, image processor 28 may be located in printing device 10 for executing operations associated with transparent object manager 42. However, in some embodiments, image processor 28 may be located in computer system 12. By executing operations associated with transparent object manager 42 at computer system 12, the number of objects sent from the computer system to printing device 10 may be reduced. Additionally, transparent object manager 42 may be stored in memory or storage device in communication with computer system 12.

Figure 4:
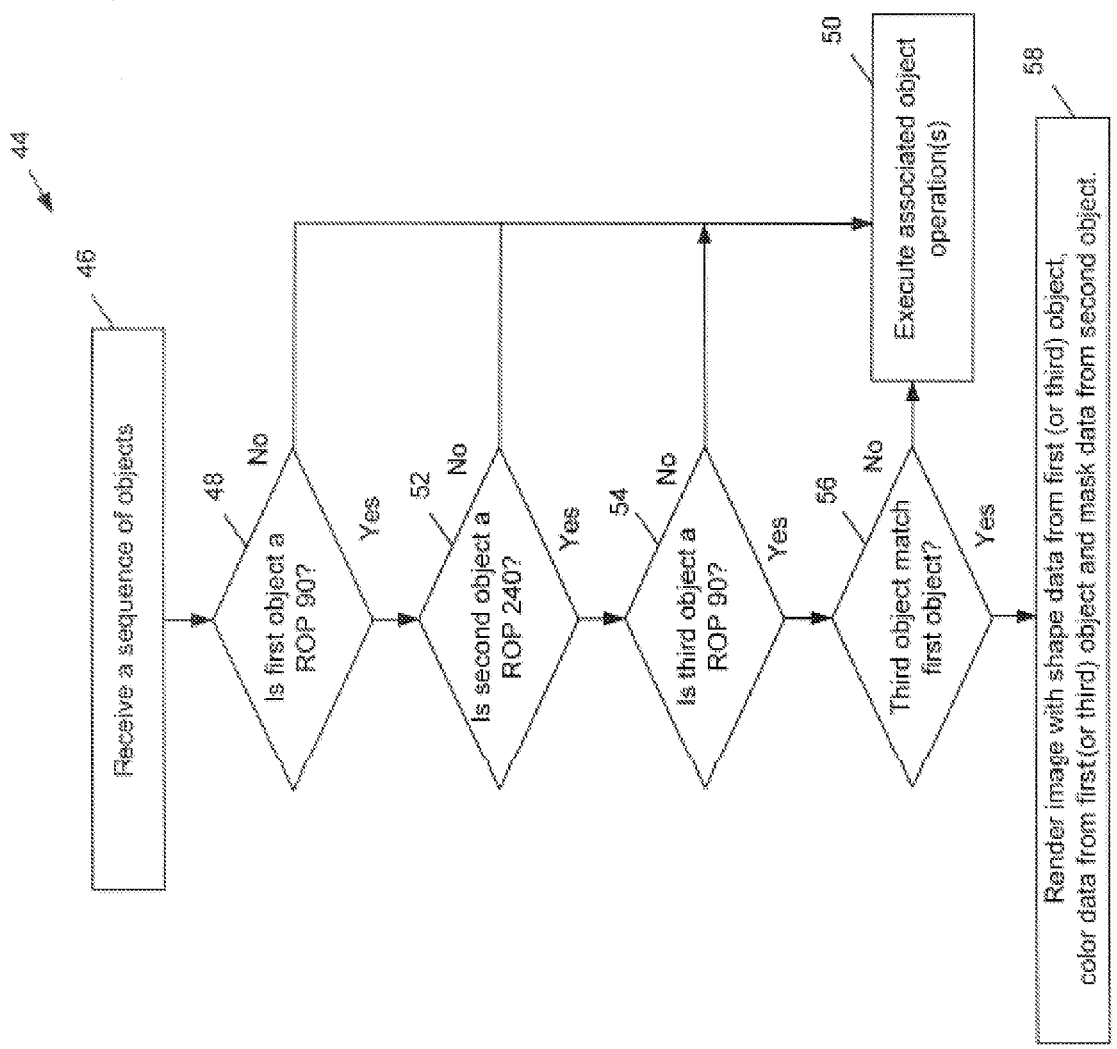
FIG. 4 is a flow chart of some operations associated with the transparent object imager of FIG. 2.

Referring to FIG. 4, a flowchart 44 presents some operations of transparent object manager 42. Some operations may include receiving 46 a sequence of objects. For example, a sequence of objects, which each include a ROP, may be received by printing device 10 from computer system 12. Some operations may also include determining if the received objects include a sequence of three ROPs (e.g., ROP 90, ROP 240 and ROP 90). As mentioned above, this sequence of three ROPs may be indicative of a transparent image being provided to printing device 10 for rendering. In this embodiment, to detect the reception of the three ROPs, operations may include determining 48 if the first object in the sequence may be ROP 90. If the first object is not a ROP 90, a sequence of three ROPs indicative of a transparent object may not be present. In such a situation operations may include executing 50 operations (e.g., render image, etc.) associated with the received object. If the first object is a ROP 90, the first object may be stored in a display list (e.g., display list 34). Additionally, if the first object is a ROP 90, operations may include determining 52 if the next object is a ROP 240. To make this determination, the object may be accessed to determine if the object may have been assigned the color black. Additionally, the object may be accessed to determine if the object may have been assigned a mask. If the second object is not a ROP 240, operations may include executing 50 operations (e.g., render the image of the object, etc.) associated with the first and/or second object. If the second object is a ROP 240, operations may include storing the object in the display list and determining 54 if the third object in the three object sequence is another ROP 90. If the third object is not a ROP 90, operations may include executing 50 operations (e.g., render image, etc.) associated with the first, second and/or third objects. If the third object is a ROP 90, operations may include storing the third object in the display list and determining 56 if attributes of the third object match attributes of the first object. For example, attributes such as color, shape, destination, etc. of the first and third object may need to match to produce the transparent image. If the first and third objects do not match, operations may include executing 50 operations associated with the first, second and/or objects.

If a match is detected, operations may include rendering 58 an image by using the first or third objects and the second object. Since the first and third objects have been determined to be equivalent, data associated with either the first or third object may be used. Furthermore, the object (e.g., the first object, the third object) not used to provide data may be discarded. Thus, memory space and processing time may be conserved by discarding either the first or third object. Along with saving memory by transforming the three object sequence into a single object, this newly produced single object may have an attribute of being a relatively "simple" ROP (e.g., ROP 240). In this embodiment, to render the transparent image, the shape data provided by the first or third object is used along with color data provided by the first or third object. Additionally, mask data associated with the second object is used by print engine 32 (shown in FIG. 2) to render the image.

One or more of the operations associated with flowchart 44 may be performed by one or more programmable processors (e.g., a microprocessor, an ASIC, etc.) such as image processor 28 executing a computer program. The execution of one or more computer programs may include operating on input data (e.g., data provided from a memory and/or storage device, etc.) and generating output (e.g., sending data to a computer system, etc.). The operations may also be performed by a processor implemented as special purpose logic circuitry (e.g., an FPGA (field programmable gate array), an ASIC (application-specific integrated circuit), etc.).

Operation execution may also be executed by digital electronic circuitry, or in computer hardware, firmware, software, or in combinations of them. The operations described in flowchart 44 may be implemented as a computer program product, e.g., a computer program tangibly embodied in an information carrier, e.g., in a machine-readable storage device (e.g., RAM, ROM, hard-drive, CD-ROM, etc.) or in a propagated signal. The computer program product may be executed by or control the operation of, data processing apparatus, e.g., a programmable processor, a computer, or multiple computers. A computer program may be written in one or more forms of programming languages, including compiled or interpreted languages, and it can be deployed in any form, including as a stand-alone program or as a module, component, subroutine, or other unit suitable for use in a computing environment. A computer program may be deployed to be executed on one computing device (e.g., controller, computer system, etc.) or on multiple computing devices (e.g., multiple controllers) at one site or distributed across multiple sites and interconnected by a communication network.

A number of implementations have been described. Nevertheless, it will be understood that various modifications may be made. Accordingly, other implementations are within the scope of the following claims.

What is claimed is:
1. A method, comprising:
receiving a first Boolean logical exclusive OR raster operation object, the first Boolean logical exclusive OR raster operation object including a raster operation requesting that a first Boolean logical exclusive OR operation be performed;
receiving a copy raster operation object, the copy raster operation object including a raster operation requesting a copy operation;
receiving a second Boolean logical exclusive OR raster operation object, the second Boolean logical exclusive OR raster operation object including a raster operation requesting that a second Boolean logical exclusive OR operation be performed, the first and second Boolean logical exclusive OR raster operation objects and the copy raster operation object each comprising a PDL object for use in producing a printed image having a plurality of shapes, the plurality of shapes including a first shape and a second shape positioned beneath the first shape in the image, the first shape being transparent such that the first shape and an area of the second shape beneath the first shape in the image to be printed are both visible;
  determining whether attributes of the second Boolean logical exclusive OR raster operation object match attributes of the first Boolean logical exclusive OR raster operation object; and
  upon an affirmative determination, selecting shape data associated with either the first or second Boolean logical exclusive OR raster operation object, color data associated with either the first or second Boolean logical exclusive OR raster operation object and mask data associated with the copy raster operation object to render a transparent image, and discarding data from unselected data of either first or second Boolean logical exclusive OR raster operation object.

2. The method of claim 1, further comprising:
rendering a transparent image using the shape data, the color data and the mask data.

3. The method of claim 1, further comprising:
storing the first Boolean logical exclusive OR raster operation object in memory.

4. The method of claim 1, further comprising:
storing the second Boolean logical exclusive OR raster operation object in memory.

5. The method of claim 1, further comprising:
storing the copy raster operation object in memory.

6. The method of claim 1, further comprising:
determining whether the first Boolean logical exclusive OR raster operation object includes a raster operation for requesting a Boolean logical exclusive OR operation be performed;
upon a negative determination, rendering an image associated with the first Boolean logical exclusive OR raster operation object.

7. The method of claim 1, further comprising:
determining whether the copy raster operation object provides a shape that may be assigned a particular color and include a mask;
upon a negative determination, rendering an image associated with the copy raster operation object.

8. The method of claim 1, further comprising:
determining whether the second Boolean logical exclusive OR raster operation object includes a raster operation for requesting a Boolean logical exclusive OR operation be performed;
upon an negative determination, rendering an image associated with the second Boolean logical exclusive OR raster operation object.

9. The method of claim 1, wherein the copy raster operation object includes a mask and is associated with the color black.

10. The method of claim 1, further comprising upon a negative determination, rendering an image from the first Boolean logical exclusive OR raster object separately from rendering one or more images from the copy raster operation object and the second Boolean logical exclusive OR raster object.

11. The method of claim 1, wherein the attributes include color, shape and destination.

12. The method of claim 1, wherein the selecting comprises selecting shape data and color data from only one of the first and second Boolean logical exclusive OR raster operation objects.

13. The method of claim 1, wherein the selecting reduces the number of objects to be processed to less than three objects for rendering the first shape.

14. The method of claim 1, wherein the selecting transforms the first Boolean logical exclusive OR raster operation object, the copy raster operation object, and the second Boolean logical exclusive OR raster operation object into a single PDL object for rendering the printed image, the single object having a subset of attributes of the first Boolean logical exclusive OR raster operation object and a subset of attributes of the copy raster operation object.

15. The method of claim 14, wherein the single PDL object has less raster operations to be executed for producing the image than a total number of raster operations to be executed in the first and second Boolean logical exclusive OR raster operation objects and the copy raster operation object.

16. An article, comprising:
a non-transitory storage medium storing instructions that when executed by a machine result in the following operations:
  receiving a first Boolean logical exclusive OR raster operation object, the first Boolean logical exclusive OR raster operation object including a raster operation for requesting that a first Boolean logical exclusive OR operation be performed;
  receiving a copy raster operation object, the copy raster operation object including a raster operation for requesting a copy operation;
  receiving a second Boolean logical exclusive OR raster operation object, the second Boolean logical exclusive OR raster operation object including a raster operation for requesting that a second Boolean logical exclusive OR operation be performed, the first and second Boolean logical exclusive OR raster operation objects and the copy raster operation object each being a PDL object for use in producing a printed image having a plurality of shapes, the plurality of shapes including a first shape and a second shape positioned beneath the first shape in the image, the first shape being transparent such that the first shape and an area of the second shape beneath the first shape in the image to be printed are both visible;
  determining whether attributes of the second Boolean logical exclusive OR raster operation object match attributes of the first Boolean logical exclusive OR raster operation object; and
  upon an affirmative determination, selecting shape data associated with either the first or second Boolean logical exclusive OR raster operation object, color data associated with either the first or second Boolean logical exclusive OR raster operation object and mask data associated with the copy raster operation object to render the first shape transparent, and discarding data from unselected data of either first or second Boolean logical exclusive OR raster operation object.

17. The article of claim 16, wherein said instructions that when executed by said machine result in the following additional operations:
rendering an image using the shape data, the color data and the mask data.

18. The article of claim 16, wherein said instructions that when executed by said machine result in the following additional operations:
storing the first Boolean logical exclusive OR raster operation object in memory.

19. The article of claim 16, wherein said instructions that when executed by said machine result in the following additional operations:
storing the second Boolean logical exclusive OR raster operation object in memory.

20. The article of claim 16, wherein said instructions that when executed by said machine result in the following additional operations:
    storing the copy raster operation object in memory.

21. The article of claim 16, wherein said instructions that when executed by said machine result in the following additional operations:
    determining whether the first Boolean logical exclusive OR raster operation object includes a raster operation for requesting a Boolean logical exclusive OR operation be performed;
    upon a negative determination, rendering an image associated with the first Boolean logical exclusive OR raster operation.

22. The article of claim 16, wherein said instructions that when executed by said machine result in the following additional operations:
    determining whether the copy raster operation object provides a shape that may be assigned a particular color and include a mask;
    upon a negative determination, rendering an image associated with the copy raster operation object.

23. The article of claim 16, wherein said instructions that when executed by said machine result in the following additional operations:
    determining whether the second Boolean logical exclusive OR raster operation object includes a raster operation for requesting a Boolean logical exclusive OR operation be performed;
    upon a negative determination, rendering an image associated with the second Boolean logical exclusive OR raster operation object.

24. The article of claim 16, wherein the copy raster operation object includes a mask and is associated with the color black.

25. The article of claim 16, wherein the instructions for selecting shape data, color data and mask data transforms the first exclusive Boolean logical OR raster operation object, the copy raster operation object, and the second Boolean logical exclusive OR raster operation object into a single PDL object for rending the image, the single object having a subset of attributes of the first Boolean logical exclusive OR raster operation object and a subset of attributes of the copy raster operation object the single PDL object having less raster operations than a total number of raster operations in the first and second Boolean logical exclusive OR operation objects and the copy raster operation object for producing the printed image.

26. A system comprising:
    an image processor configured to receive raster operation objects comprising PDL objects for use in producing a printed image having a plurality of shapes, the plurality of shapes including a first shape and a second shape positioned beneath the first shape in the image, the first shape being transparent such that the first shape and an area of the second shape beneath the first shape in the image to be printed are both visible, wherein if a first Boolean logical exclusive OR raster operation PDL object having a raster operation for requesting that a Boolean logical exclusive OR operation be performed, a copy raster operation PDL object having a raster operation for requesting a copy operation, and a second Boolean logical exclusive OR raster operation PDL object having a raster operation for requesting that a Boolean logical exclusive OR operation be performed are received, the image processor is further configured to determine whether attributes of the second Boolean logical exclusive OR raster operation PDL object match attributes of the first Boolean logical exclusive OR raster operation PDL object and upon an affirmative determination, reducing the first and second Boolean logical exclusive OR raster operation PDL objects and the copy raster operation PDL object into a single raster operation PDL object by selecting shape data associated with either the first or second Boolean logical exclusive OR raster operation PDL object, color data associated with either the first or second Boolean logical exclusive OR raster operation PDL object and mask data associated with the copy raster operation PDL object for the single raster operation PDL object, the reducing to the single raster operation thereby reducing a number of raster operations to be executed for producing the printed image.

27. The system of claim 26, wherein the image processor is further configured to initiate rending of the first shape in the image by using the shape data, the color data and the mask data.

28. The system of claim 26, wherein the image processor is further configured to determine whether the first Boolean logical exclusive OR raster operation PDL object includes a raster operation for requesting a Boolean logical exclusive OR operation be performed and upon a negative determination, initiate rendering of an image associated with the first Boolean logical exclusive OR raster operation PDL object.

29. The system of claim 26, wherein the image processor is further configured to determine whether the copy raster operation PDL object provides a shape that may be assigned a particular color and include a mask and upon a negative determination, initiate rendering of an image associated with the copy raster operation PDL object.

30. The system of claim 26, wherein the image processor is further configured to determining whether the second Boolean logical exclusive OR raster operation PDL object includes a raster operation for requesting a Boolean logical exclusive OR operation be performed and upon a negative determination, initiate rendering of an image associated with the second Boolean logical exclusive OR raster operation PDL object.

31. The system of claim 26, further comprising:
    memory configured to store the first Boolean logical exclusive OR raster operation PDL object.

32. The system of claim 26, wherein the image processor is located in a printer.

33. The system of claim 26, wherein the image processor is located in a computer system.

34. The system of claim 26, wherein the copy raster operation PDL object includes a mask and is associated with the color black.

* * * * *